No. 717,534. PATENTED JAN. 6, 1903.
J. BRAUCHLI.
T AND ANGLE SQUARE.
APPLICATION FILED FEB. 27, 1902.
NO MODEL. 2 SHEETS—SHEET 1.
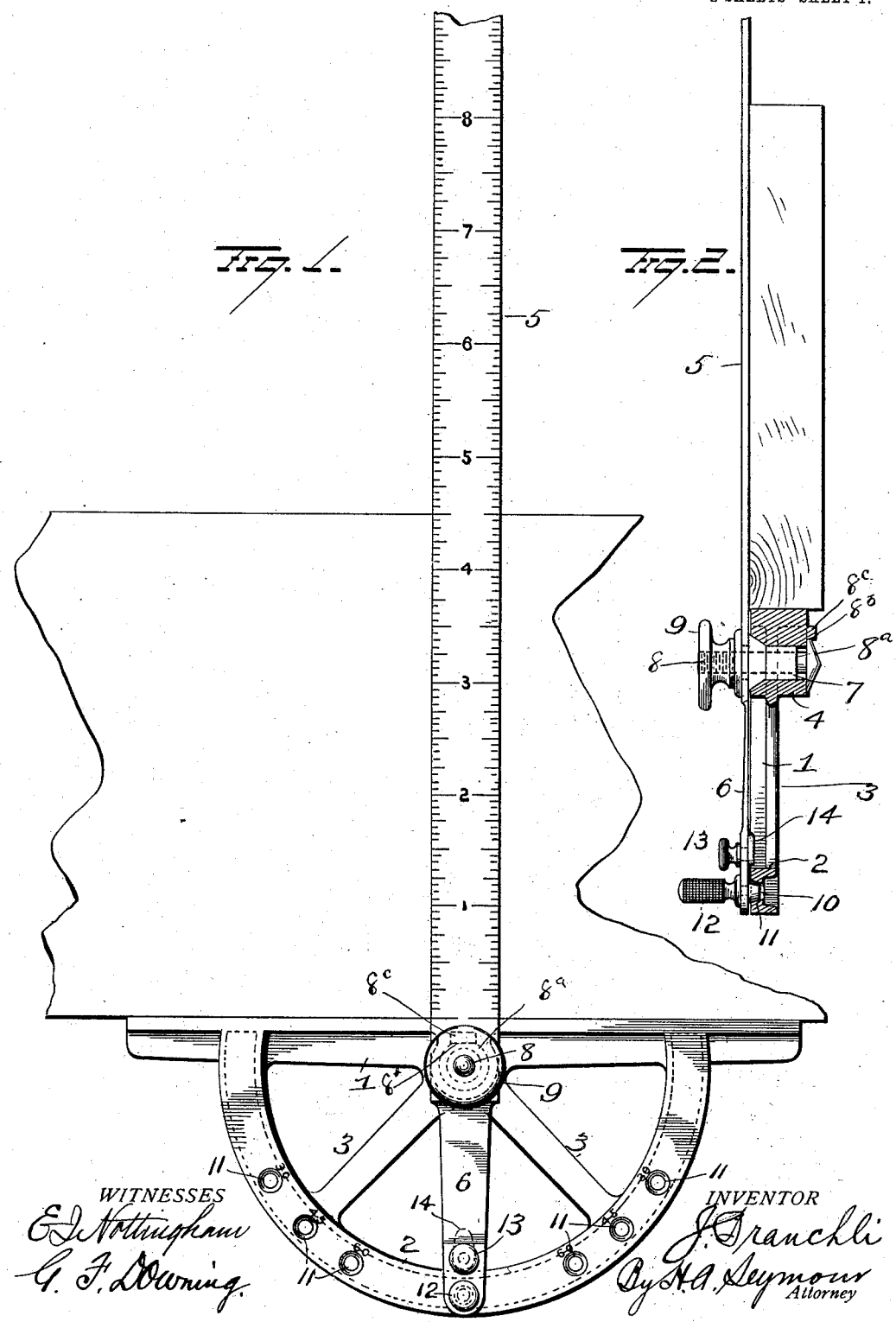
WITNESSES
INVENTOR

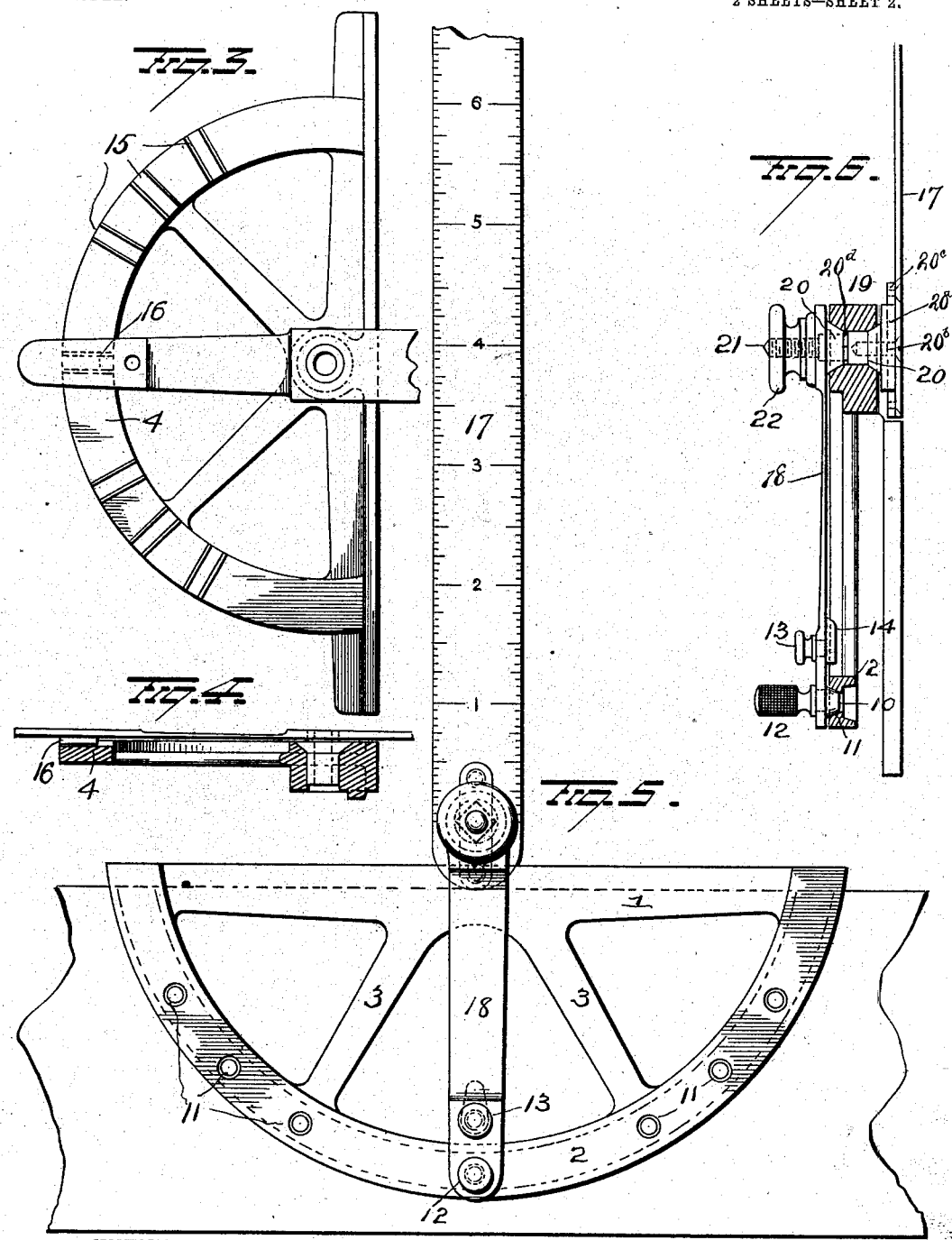

UNITED STATES PATENT OFFICE.

JACOB BRAUCHLI, OF HAMPTON, VIRGINIA.

T AND ANGLE SQUARE.

SPECIFICATION forming part of Letters Patent No. 717,534, dated January 6, 1903.

Application filed February 27, 1902. Serial No. 95,964. (No model.)

*To all whom it may concern:*

Be it known that I, JACOB BRAUCHLI, a resident of Hampton, in the county of Elizabeth City and State of Virginia, have invented certain new and useful Improvements in T and Angle Squares; and I do hereby declare the following to be a full, clear, and exact description of the invention, such as will enable others skilled in the art to which it appertains to make and use the same.

My invention relates to an improved adjustable T and angle square, the object of the invention being to provide a device of this character which can be quickly and accurately adjusted to any angle desired and when so adjusted effectually secure the square at the angle desired; and with this object in view the invention consists in certain novel features of construction and combinations and arrangements of parts, as will be more fully hereinafter described, and pointed out in the claims.

In the accompanying drawings, Figure 1 is a plan view illustrating my improvements. Fig. 2 is a side view, partly in section, of the same; and Figs. 3, 4, 5, and 6 are views illustrating modified forms of my invention.

It is a well-known fact that in every-day practice angles of ninety degrees, sixty degrees, forty-five degrees, and thirty degrees and combinations of these angles are used wherever possible, (for geometrical reasons,) and only occasionally it happens that other angles have to be resorted to. Recognizing some of the disadvantages of existing T and angle squares, it has been my aim to design an instrument which should supply a long-felt want to a large majority of wood and metal workers in the industrial arts and to overcome objectionable features in devices heretofore known—as, for instance, the excessive cost and the requirement of good eyesight and skill to adjust them and upon which depends the accuracy of setting, and with the object of overcoming these and other objections my invention was devised and will now be explained.

1 represents the head of the instrument, comprising the straight-edge 1 and the semicircular or curved frame 2, integral with the straight-edge at its ends and connected thereto between its ends by integral radial arms 3, at the juncture of which latter and the straight-edge a hub 4 is provided.

5 represents the blade, preferably marked in the scale of inches and fractions thereof, and is made at one end in the form of a contracted spring-tongue 6 and near the juncture of the tongue with an integral beveled sleeve 7, pivotally mounted in a similarly-shaped bearing in hub 4. A headed screw 8 is passed through sleeve 7 and blade 5, the head $8^a$ of the screw bearing against the hub, as shown, and having a flattened portion $8^b$ bearing against a lug $8^c$ on the hub 4 to prevent the screw from turning. A thumb-nut 9 is located on the screw above the blade to securely clamp the parts together when desired; but for ordinary use the nut is sufficiently loose to permit the free pivotal movement of the blade.

The free end of spring-tongue 6 is provided on its lower face with a beveled lug 10 to fit into any of a series of beveled openings or pockets 11 in the curved frame 4 and be held therein by the spring tension of the tongue to secure the blade at the angle desired, and a milled knob 12 is preferably provided on the tongue to facilitate the raising of lug 10 out of the openings and holding the same elevated until the proper adjustment is made. These openings are located at just the proper positions to hold the blade at ninety degrees, sixty degrees, forty-five degrees, and thirty degrees, the last three openings being on both sides of the central opening, for when the lug 10 is in the central opening the blade is at right angles, or, in other words, at an angle of ninety degrees. I preferably indicate on the curved frame between the several openings the angles so stated for convenience in adjusting the blade to different angles; but this may be dispensed with, if desired.

Near the outer end of tongue 6 a knobbed spindle 13 is mounted and carries a beveled finger 14, which may be turned by the spindle between the tongue 6 and semicircular frame 2 and is of sufficient thickness to hold the lug 10 out of the openings 11 in said frame, when the blade can be adjusted to any fraction of the above angles and secured against movement by thumb-nut 9.

In Figs. 3 and 4 I have illustrated a slightly-modified form of my invention, in which a series of parallel flanges forming pockets 15 are located on the semicircular frame 2 to receive an elongated lug 16 on the tongue to lock the blade at the angle desired, and a great many other constructions of interlocking mechanism might be employed for connecting the frame and tongue, the spring tension of the latter holding the parts together.

In Figs. 5 and 6 I have shown still another modified form of my invention, which is especially adapted for use on plane surfaces either with or without a straight-edge. In this form of my invention the blade 17 and tongue 18 are made separate, the former located below and the latter above hub 19 and each of which is provided with a beveled sleeve 20 to fit into beveled ends of the hub. The upper sleeve 20 may be made integral with the tongue 4; but the lower sleeve 20 projects upwardly from a reinforcing-disk $20^a$, mounted on the blade 17, said disk and lower sleeve being secured to the blade by means of a screw $20^b$, and the under face of the disk $20^a$ is grooved for the accommodation of a plate $20^c$, secured to the blade 17. The lower sleeve 20 is provided with an angular extension $20^d$, which passes upwardly through the upper sleeve 20, and a threaded shank 21 projects from said angular extension. A thumb-nut 22 is placed on the threaded shank 21 and serves to clamp the parts together.

A great many other slight changes and alterations might be made in the general form and arrangement of the several parts described without departing from my invention, and hence I would have it understood that I do not limit myself to the precise details set forth, but consider myself at liberty to make such slight changes and alterations as fairly fall within the spirit and scope of my invention.

Having fully described my invention, what I claim as new, and desire to secure by Letters Patent, is—

1. The combination with a frame having a straight and a curved portion, the curved portion having a series of pockets, of a blade pivoted to the frame, a spring-tongue connected with said blade, a lug projecting from said spring-tongue for entering the pockets in the curved portion of the frame and means for preventing said lug from entering any of said pockets.

2. A square comprising a circular head or frame, a blade pivoted thereto and having a spring-tongue, a lug on said tongue adapted to be held in any of a series of pockets in the head or frame, a knobbed spindle, a finger thereon adapted to be turned to rest between the spring-tongue and frame and hold the lug out of all of the pockets, and means at the pivotal point of the blade for locking the same at any angle.

3. A square comprising a semicircular head or frame having an integral hub at the center of its straight-edge, a blade having an integral sleeve in said hub, a screw in said sleeve having a head at one end against the hub, and a thumb-nut on said screw above the blade, a spring-tongue on said blade, a lug on said tongue to enter any of a series of pockets in the circular head or frame, and be held therein by the spring-tension of the tongue, and a knob on said tongue to permit the lug to be raised out of said pockets.

In testimony whereof I have signed this specification in the presence of two subscribing witnesses.

JACOB BRAUCHLI.

Witnesses:
GEO. W. BUCK,
W. H. PARKER.